United States Patent [19]

Becerra-Novoa

[11] Patent Number: 4,834,792
[45] Date of Patent: May 30, 1989

[54] METHOD FOR PRODUCING HOT SPONGE IRON BY INTRODUCING HYDROCARBON FOR CARBURIZING INTO REDUCTION ZONE

[75] Inventor: Jorge O. Becerra-Novoa, Apodaca, Mexico

[73] Assignee: Hylsa S.A. de C.V., Monterrey, Mexico

[21] Appl. No.: 898,940

[22] Filed: Aug. 21, 1986

[51] Int. Cl.[4] ............................................. C21B 13/02
[52] U.S. Cl. ........................................... 75/35; 75/91
[58] Field of Search ................................. 75/34, 35, 91

[56] References Cited

U.S. PATENT DOCUMENTS

| | | | |
|---|---|---|---|
| 3,749,386 | 7/1973 | Beggs et al. | 75/35 |
| 4,002,422 | 1/1977 | Escott | 432/99 |
| 4,046,557 | 9/1977 | Beggs | 75/35 |
| 4,268,303 | 5/1981 | Kaneko et al. | 75/35 |
| 4,270,739 | 6/1981 | Ahrendt et al. | 266/156 |
| 4,439,233 | 3/1984 | Faccore | 75/35 |
| 4,556,417 | 12/1985 | Martinez-Vera et al. | 75/35 |
| 4,702,766 | 10/1987 | Love et al. | 75/35 |
| 4,720,299 | 1/1988 | Milionis | 75/35 |
| 4,752,329 | 6/1988 | Freeland et al. | 75/35 |

FOREIGN PATENT DOCUMENTS

| | | | |
|---|---|---|---|
| 71314 | 4/1983 | Japan | 75/34 |
| 2064590 | 6/1981 | United Kingdom | 75/34 |

Primary Examiner—Melvyn J. Andrews
Attorney, Agent, or Firm—A. Thomas S. Safford; Curtis, Morris & Safford

[57] ABSTRACT

A method and apparatus for the direct gaseous reduction of iron ore to sponge iron at an elevated temperature suitable for hot briquetting, wherein a hot reducing gas is circulated upwardly through a descending body of iron ore and a make-up reducing gas stream is added to the circulating gas stream. A sponge iron product having a predetermined desired degree of carburization in the range 0.5% to 4% is obtained by adding a controlled flow of natural gas or other methane-containing gas to said make-up gas stream or to said circulating gas stream.

20 Claims, 1 Drawing Sheet

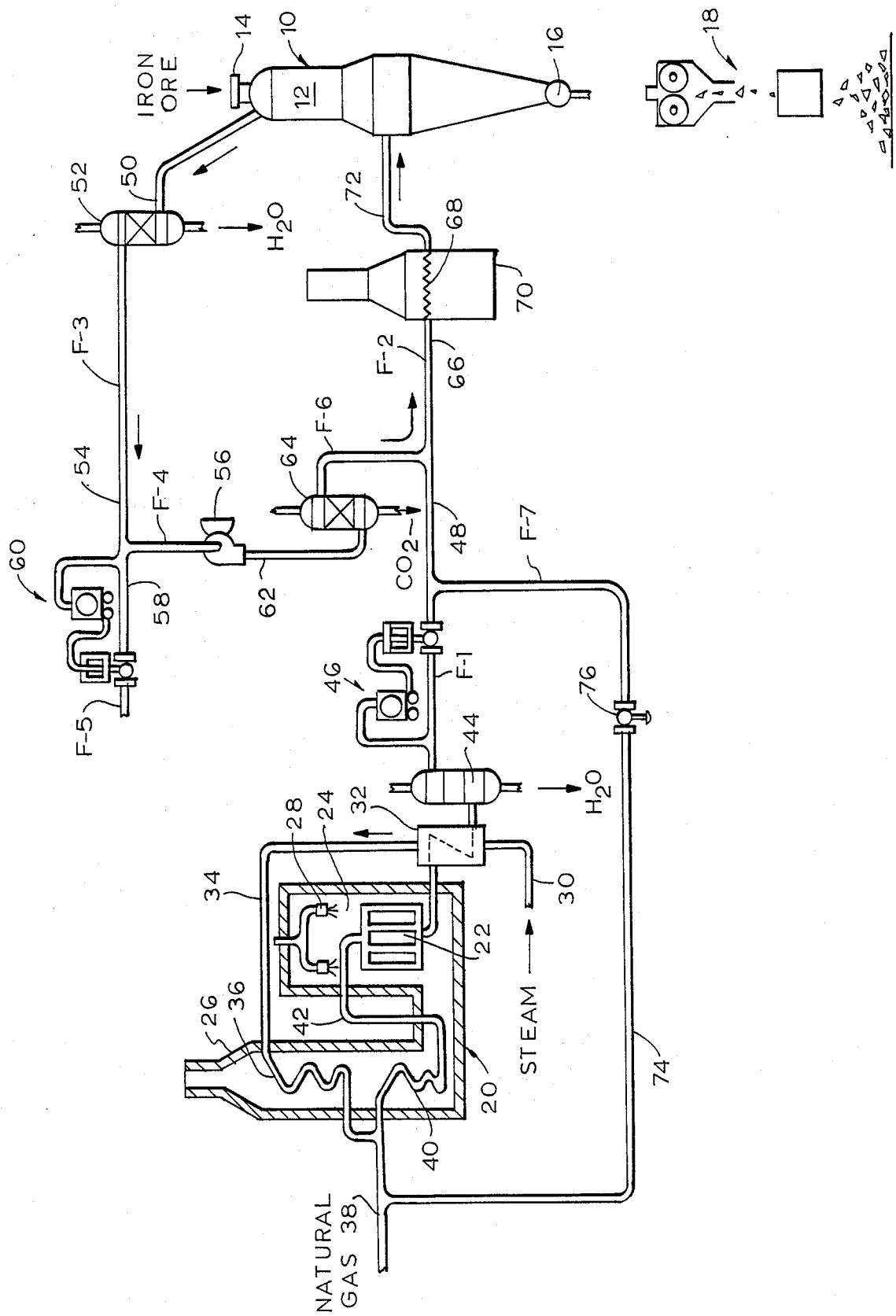

METHOD FOR PRODUCING HOT SPONGE IRON BY INTRODUCING HYDROCARBON FOR CARBURIZING INTO REDUCTION ZONE

FIELD OF THE INVENTION

This invention relates to a process for the direct gaseous reduction of iron ore to produce sponge iron, and more particularly, to an improved method for producing hot sponge iron of a predetermined degree of carburization for briquetting while it is still at a relatively high temperature and/or feeding it hot directly to a refining furnace or to a melter or the like.

BACKGROUND OF THE INVENTION

Typical gaseous reduction systems incorporating vertical shaft, moving bed iron ore reduction reactors are disclosed in U.S. Pat. Nos. 3,765,872; 3,770,421; 3,779,741; and 3,816,102. In such systems reduction of the ore has commonly been effected by a reducing gas largely composed of carbon monoxide and hydrogen obtained by the catalytic reformation of a mixture of natural gas and steam. Such systems typically comprise a vertical shaft reactor having a reducing zone in the upper portion thereof and a cooling zone in the lower portion thereof. The ore to be reduced is fed to the top of the reactor and flows downwardly therethrough, first through the reducing zone wherein it is brought into contact with hot reducing gas and then through a cooling zone wherein it is cooled by a gaseous coolant before being removed at the bottom of the reactor. Effluent gas from the reducing zone is cooled to remove water therefrom, and in most cases a major part of the cooled effluent gas is reheated and recycled to the reducing zone. Similarly, at least a part of the cooling gas withdrawn from the cooling zone is commonly cooled and recycled to the cooling zone to cool the sponge iron to, or close to, the ambient temperature. At its lower end the reactor is provided with some means for controlling the discharge of cooled sponge iron from the reactor, e.g., a rotary discharge valve, a vibratory chute, conveyor belt or the like.

Sponge iron that is to be used in steel-making should desirably contain from 1% to 4% carbon, preferably in the form of ferric carbide rather than elemental carbon, such as soot. While a certain amount of carburization occurs in the reduction zone of reactors of the type described above, most of the required carburization has previously been effected in the cooling zone. For example, when using a non-stoichiometric reformer of the type shown in U.S. Pat. No. 4,370,162 as a source of make-up reducing gas, the carburization of sponge iron in the reduction zone is likely to be no more than about 0.5%. Additional carburization necessary to bring the sponge iron up to e.g. 2% carbon has been achieved by introducing methane, which may be in the form of natural gas, into the cooling gas that is circulated through the cooling zone of the reactor.

It is often desirable to discharge the sponge iron at high temperature for direct delivery to a steel-making furnace or, when the hot spong iron cannot be used immediately, to a melter or to a machine for briquetting the hot sponge iron produced in such a reactor. Direct reduced iron in the form of briquettes is easier to handle and transport than when it is in the form of the more porous, friable, and smaller sponge iron particles. Also briquetting of the sponge iron reduces the tendency for the iron to re-oxidize when stored in contact with atmospheric air. However, as noted above, the conventional reactors deliver the sponge iron at a temperature at or near ambient temperature. Densification of the product by briquetting at such low temperatures is difficult to achieve, requires high pressures, tends to produce friable products and an undesirably high proportion of fines. As a practical matter the sponge iron should be relatively near the sintering temperature to produce briquettes having acceptable physical properties.

More particularly, briquetting of the sponge iron should preferably be done at above about 700° C. Below this temperature for most types of sponge iron the pressures typically required are too great and the wear of the briquetting equipment becomes excessive. Also, it becomes too difficult to densify the sponge iron adequately. A briquette with a density of at least 5 gm/cm$^3$ is desirable for convenience of handling and for passivation. Dense briquettes have decreased exposed surface, lower porosity, and are less prone to fragmentation and fines generation.

The production of sponge iron at a temperature suitable for hot briquetting, typically 600° to 800° C., is not just a matter of operating the cooling zone of a conventional reactor at a higher temperature. As pointed out above, the cooling zone of a reactor performs both a cooling function and a carburizing function; a proper balance of the flow rate, composition and temperature of the cooling gas must be maintained to achieve this dual function. With the reactor operating conditions previously employed it has not been possible to produce sponge iron having both the optimum temperature for hot briquetting and the desired degree of carburization.

OBJECTS OF THE INVENTION

Accordingly, it is an object of the invention to provide an improved process for producing hot sponge iron having a predetermined degree of carburization and metalization.

It is another object of the invention to provide a method of producing sponge iron having desirable properties for hot briquetting.

It is a further object of the invention to provide an improved method of producing briquetted sponge iron.

Other objects of the invention will be obvious in part, and in part pointed out hereafter.

SUMMARY OF THE INVENTION

The present invention is based on applicants' finding that it is possible, when using a conventional non-stoichiometric reformer as a source of make-up gas, to carry out all of the desired carburization of the sponge iron in the reduction zone by adding a predetermined flow of methane, which may be in the form of natural gas, to the reducing gas that flows through the moving bed or ore in the reduction zone. In carrying out the process of the invention, particulate iron ore is fed to a vertically arranged, moving bed reactor having a conventional reduction zone forming part of a reducing gas loop through which the reducing gas is circulated. The reducing gas is heated before it enters the reduction zone and cooled and de-watered (and preferably cleansed of carbon dioxide) after it leaves the reduction zone. A make-up gas stream from a suitable source, e.g. a catalytic reformer, largely composed of carbon monoxide and hydrogen is fed to the loop. In accordance with the present invention the amount of carburization that occurs in the reduction zone is increased by feeding a separate stream of methane or natural gas to the reducing gas loop. The methane may be mixed with the conventional make-up gas from the reformer and the mixture fed to the loop, or it may be separately added to the loop. This latter methane will then flow substantially unreformed into the reduction zone via the reducing gas loop, where it will be available to carburize the sponge iron (as described below).

It has been further found that the degree of carburization in the product sponge iron varies directly with the amount of methane added to the reduction zone and hence in accordance with the invention the flow of methane can be regulated to achieve a desired degree of carburization in the sponge iron product. Since all of the necessary carburization is effected in the reduction zone, the sponge iron can be used at the temperature at which it leaves the reduction zone, or cooled to an independently controllable temperature, depending upon whether it is, for example, to be directly fed to a refining furnace or melter, or briquetted for intermediate storage. Typical sponge iron product temperatures when using the present process are of the order of 600° to 900° C.

While the broad idea of feeding methane to a reduction system for the direct gaseous reduction of iron ore is disclosed in the prior art, the concept of adding a controllable flow of methane to the reducing gas loop to permit all of the desired carburization to be achieved in the reduction zone and to permit fully carburized, high temperature sponge iron to be removed from the reactor appears to be new. For example, U.S. Pat. No. 4,054,444 discloses a reactor system wherein methane or a mixture of methane and cooled top gas is introduced into a buffer zone below the reduction zone and mixed with upwardly flowing gas from the cooling zone. The added methane is reformed to carbon monoxide and hydrogen in the buffer zone by a reaction that, as taught in the patent, is endothermic and hence cools the sponge iron. Thus this prior art process cannot produce the fully carburized, hot sponge iron that can be made by applicants' process.

U.S. Pat. No. 4,439,233 discloses a reduction system having a reducing gas loop to which both methane and a preformed make-up gas are added. However, in this system the loop incorporates a stoichiometric reformer and the methane is added only to the feed gas to the reformers for reformation therein. Hence there is no methane stream that is controllably fed after the reformer and via the loop to the reduction zone to regulate the amount of carburization in the reduction zone. Also there is no teaching of carburization control in this patent.

DESCRIPTION OF THE DRAWING

In this specification and the accompanying drawing applicants have shown and described several preferred embodiments of their invention and have suggested various alternatives and modifications thereto, but it is to be understood that these are not intended to be exhaustive and that many changes and modifications can be made within the scope of the invention. These suggestions herein are selected and included for purposes of illustration in order that others skilled in the art will more fully understand the invention and principles thereof and will thus be enabled to modify it and embody it in a variety of forms, each as may be best suited to the conditions of a particular use.

The drawing illustrates diagrammatically apparatus capable of being used to carry out a preferred embodiment of the invention (here used for hot briquetting) in which a regulated stream of natural gas is introduced into the reducing gas loop to produce a desired carburization of the sponge iron product.

DETAILED DESCRIPTION

Referring to the drawing, the numeral 10 generally designates a vertical shaft reactor having a reduction zone 12 in the upper portion thereof. Ore to be reduced enters the top of the reactor through a connection 14 and is reduced to sponge iron by a hot reducing gas in the zone 12. The sponge iron product, while still hot, leaves the reactor through a conventional discharge valve 16 (adapted to high temperature use) and is briquetted by conventional briquetting apparatus 18.

Referring to the left-hand portion of the drawing, reducing gas to reduce the ore is generated in known manner in a reformer unit 20 by the catalytic conversion of a mixture of steam and natural gas (mainly methane) to a reducing gas largely composed of carbon monoxide and hydrogen. The reformer comprises a bank of catalyst-filled tubes 22 located in a heating chamber 24 that communicates with a stack 26. The catalyst tubes are externally heated by hot combustion products that are produced by the burners 28 and leave the reformer through the stack 26.

Steam to form the steam/methane mixture enters the system through a pipe 30 and flows through a heat exchanger 32 in heat exchange relationship with the catalyst tube exit gases, thence through pipe 34 to a coil 36 in stack 26 wherein it is further heated. Upon leaving the stack 26, the steam is mixed with the methane that enters the system through pipe 38. The steam/methane mixture is heated in a coil 40 within stack 26 and flows through pipe 42 to the catalyst tubes 22 wherein it is converted to carbon monoxide and hydrogen as noted above. Other hydrocarbons contained in the natural gas are also reformed at the same time. The thus formed reducing gas gives up part of its heat to the entering steam in heat exchanger 32 and is then de-watered by quench-cooling in a cooler 44, whence it passes through a flow controller 46 to the make-up gas supply pipe 48 that leads to a reducing gas loop in the right-hand portion of the drawing, now to be described.

In ore reduction systems of the general type here shown it is customary to recycle a considerable part of the reducing gas passing through the reduction zone of the reactor. Spent gas leaving the reduction zone 12 thus flows in a loop through pipe 50 to a quench cooler 52 wherein it is cooled and de-watered, then through pipe 54 to a compressor 56. A portion of the recycled gas is withdrawn from the loop through pipe 58 containing a back pressure regulator 60 and is transferred to a suitable point of storage or use as a fuel etc. or is vented to the atmosphere. The regulator 60 serves to maintain the reactor 10 and associated equipment at a desired pressure. The removed portion prevents the build-up of nitrogen or excessive amounts of other unwanted gases in the reducing gas loop.

From the discharge of blower 56 the recycled gas flows successively through a pipe 62, a carbon dioxide removal unit 64, pipe 66, a coil 68 of a heater 70 wherein it is heated preferably to a temperature of approximately 900° C. to 950° C., and a pipe 72 that conducts the hot reducing gas to the bottom of zone 12 to complete the reducing gas loop. As shown, the fresh reducing gas from the reformer 20 flows through pipe 49 to pipe 66 where it is mixed with the recycle gas, and the blend of recycle gas and fresh gas is heated in heater 70 before being fed to zone 12 of the reactor.

In accordance with the invention a separate stream of methane or methane-containing gas is introduced into the reducing gas loop. Thus a portion of the natural gas flowing through pipe 38 is diverted through pipe 74 containing regulating valve 76 and delivered to pipe 48. The added methane in admixture with make-up gas from reformer 20 is combined with the recycle gas in pipe 66 and the resulting mixture is heated in coil 68 of heater 70 before being fed through pipe 72 to the reduction zone 12. The reducing gas feed temperature used is conventional for direct reduction processes, e.g. 850° to 950° C.

As pointed out above, it has been found that the amount of carburization of the product sponge iron varies directly with the amount of methane added. However, it has not been found possible to specify this relationship precisely since it is not a strict proportionality and varies as a function of such factors as the nature of the ore being treated and the operating conditions in the reactor. To illustrate the results that can be obtained with the present invention, the following examples are given of sets of conditions that have produced sponge iron products with different degrees of carburization.

EXAMPLE 1

A sponge iron product having 92.1% metallization, a carbon content of 0.63% as ferric carbide, a total iron content of 93.4% and a discharge temperature of 750° C. was produced in a reactor wherein the inlet temperature of the reducing gas was 775° C. and the effluent gas temperature was 450° C. The flow rates and compositions of seven gas streams identified as F1 through F7 are given in Table I below. The locations of these seven streams are indicated on the drawing.

In the Table, gas flows are given in normal cubic meters per metric ton of sponge iron produced. Gas compositions are given in mol percentages.

TABLE I

|       | F1   | F2   | F3   | F4   | F5   | F6   | F7  |
|-------|------|------|------|------|------|------|-----|
| Flow  | 667  | 2415 | 1943 | 1879 | 64   | 1748 | 0.0 |
| H2    | 74.7 | 72.9 | 67.5 | 67.5 | 67.5 | 72.4 | 0.0 |
| CO    | 12.5 | 10.1 | 8.5  | 8.5  | 8.5  | 9.1  | 0.0 |
| CO2   | 9.2  | 2.6  | 6.8  | 6.8  | 6.8  | 0.0  | 0.0 |
| CH4   | 1.9  | 10.6 | 12.9 | 12.9 | 12.9 | 13.9 | 0.0 |
| C2H6  | 0.0  | 0.0  | 0.0  | 0.0  | 0.0  | 0.0  | 0.0 |
| N2    | 0.2  | 2.1  | 2.6  | 2.6  | 2.6  | 2.8  | 0.0 |
| H2O   | 1.5  | 1.7  | 1.7  | 1.7  | 1.7  | 1.7  | 0.0 |

EXAMPLE 2

A sponge iron product having a metallization of 93.1%, a carbon content of 2.31%, a total iron content of 92.6% and a discharge temperature of 750° C. was produced in a reactor fed with a reducing gas temperature of 775° C. and an effluent gas temperature of 440° C. The flow rates and compositions of the seven gas streams F1 through F7 are given below.

TABLE II

|       | F1   | F2   | F3   | F4   | F5   | F6   | F7   |
|-------|------|------|------|------|------|------|------|
| Flow  | 650  | 2410 | 1919 | 1860 | 59   | 1740 | 19   |
| H2    | 74.4 | 72.3 | 67.8 | 67.8 | 67.8 | 72.4 | 0.0  |
| CO    | 12.6 | 9.2  | 7.5  | 7.5  | 7.5  | 8.0  | 0.0  |

TABLE II-continued

|       | F1  | F2   | F3   | F4   | F5   | F6   | F7   |
|-------|-----|------|------|------|------|------|------|
| CO2   | 9.5 | 2.5  | 6.2  | 6.2  | 6.2  | 0.0  | 0.8  |
| CH4   | 1.7 | 11.7 | 13.6 | 13.6 | 13.6 | 14.5 | 91.8 |
| C2H6  | 0.0 | 0.1  | 0.0  | 0.0  | 0.0  | 0.0  | 6.3  |
| C3H8  | 0.0 | 0.0  | 0.0  | 0.0  | 0.0  | 0.0  | 0.4  |
| N2    | 0.3 | 2.7  | 3.4  | 3.4  | 3.4  | 3.6  | 0.7  |
| H2O   | 1.5 | 1.5  | 1.5  | 1.5  | 1.5  | 1.5  | 0.0  |

EXAMPLE 3

A sponge iron product having a carbon content of 1.8% and a discharge temperature of 800° C. was produced in a reactor having a feed gas temperature of 925° C. and an effluent gas temperature of 430° C. The flow rates of gas streams F1 to F7 and the compositions of certain of the streams are given below.

TABLE III

|       | F1    | F2    | F3    | F4    | F5    | F6    | F7    |
|-------|-------|-------|-------|-------|-------|-------|-------|
| Flow  | 500   | 2200  | 2305  | 1784  | 90    | 1640  | 60    |
| H2    | 70.70 | 71.68 | 55.69 | 68.56 | 68.56 | 74.58 | 0.07  |
| CO    | 17.06 | 11.50 | 7.64  | 9.40  | 9.40  | 10.23 | 0.00  |
| CO2   | 3.70  | 2.47  | 7.09  | 8.71  | 8.71  | 0.70  | 7.23  |
| CH4   | 3.24  | 12.54 | 9.66  | 11.89 | 11.89 | 12.93 | 79.36 |
| C2H6  | 0.00  | 0.24  | 0.00  | 0.00  | 0.00  | 0.00  | 8.58  |
| C3H8  | 0.00  | 0.10  | 0.00  | 0.00  | 0.00  | 0.00  | 3.62  |
| C4H10 | 0.00  | 0.00  | 0.00  | 0.00  | 0.00  | 0.00  | 0.87  |
| C5H12 | 0.00  | 0.00  | 0.00  | 0.00  | 0.00  | 0.00  | 0.20  |
| H2O   | 1.28  | 1.26  | 19.74 | 1.23  | 1.23  | 1.33  | 0.00  |
| N2    | 0.02  | 0.18  | 0.18  | 0.21  | 0.21  | 0.23  | 0.07  |

From the foregoing description it should be apparent that the present invention provides an efficient and effective method for producing sponge iron having a predetermined desired degree of carburization at at temperature suitable for briquetting. The invention can also be used to produce a suitably carburized sponge iron at a temperature of the order of 900° C. for direct feeding to a steel-making furnace, melter or the like. In one of the broader aspects of the invention, other carburizing sources may be used, such as gasifier gas, process gas, powdered charcoal, lower hydrocarbon gases, etc. in place of or in addition to methane or natural gas.

The carburizing gas from pipe 74 is optimally fed, mixed or unmixed, into the loop of the first gas stream between the CO2 removal unit 64 and the heater 70. Broadly considered, this feed could be to the cooled first gas stream prior to the CO2 removal unit (since F1 and F7 have CO2 present). However, this would increase the size and cost of the CO2 unit without sufficient cost benefit from the minor additional CO2 removed.

What is claimed is:
1. A process for producing sponge iron at an elevated temperature from a particulate iron ore in a vertically-arranged moving-bed reactor having a reduction zone by treatment with a reducing gas circulating through a reducing gas loop which loop comprises said reduction zone, an external cooling and de-watering means, and an external heating means, which process comprises the steps of supplying ore to be reduced to the upper portion of said reduction zone, circulating a hot first gas stream largely composed of carbon monoxide and hydrogen with some water and carbon dioxide reaction products and some unreacted methane from said reduction zone through said external means in reducing gas loop and back through said reducing zone, cooling and dewatering said first gas stream circulating in said reducing gas loop after the first gas stream leaves said reduction zone, feeding a second gas stream to said loop after said cooling and dewatering steps and before the reduction zone as a make-up to the reducing gas in said loop which second gas stream ultimately functions largely as a source of carbon monoxide and hydrogen for said reduction zone, feeding a third gas stream largely composed of methane to said reduction zone via said loop after said cooling and dewatering steps and before the reduction zone and in a manner such that the methane carburizes the sponge iron in said reduction zone, heating such first, second and third gas streams such that the resulting combination of said streams, commonly fed via said loop to said reducing zone, are in a temperature range effective for reducing said ore in said reducing zone, regulating the flow of methane fed to said reduction zone via said loop to vary directly the degree of carburization so as to achieve a predetermined degree of carburization in said sponge iron, and removing from said reactor hot sponge iron carburized to the predetermined degree.

2. A process according to claim 1 wherein said second and third streams are mixed before being fed to said first gas stream after the latter has been cooled and before the reduction zone.

3. A process according to claim 1 wherein said second and third streams are separately fed to said first gas stream after the latter has been cooled and before the reduction zone.

4. A process according to claim 1 wherein said third gas stream is natural gas.

5. A process according to claim 1 wherein said third stream is fed to said loop at a rate to produce from 0.5% to 4.0% carburization of the sponge iron.

6. A process according to claim 1 wherein the hot sponge iron removed from the reactor is briquetted.

7. A process according to claim 20 wherein the gas temperature of said first gas stream, when fed to the reactor is 850° C. to 950° C.

8. A process according to claim 1, further comprising removing carbon dioxide from said first gas stream after the latter has been cooled and before the reduction zone.

9. A process according to claim 7, further comprising removing carbon dioxide from said first gas stream after the latter has been cooled and before the reduction zone, said third gas stream being natural gas which is supplied to said first gas stream after the removal from the latter of carbon dioxide, and said third gas stream being fed at a rate to produce from 0.5% to 4% carburization of the sponge iron.

10. A process according to claim 1, further comprising generating a reformed gas largely composed of carbon monoxide and hydrogen which reformed gas comprises said second gas stream.

11. A process according to claim 10, wherein said second and third streams are separately fed to said first stream after the latter has been cooled and before the reduction zone.

12. A process according to claim 10, wherein said third gas stream is natural gas.

13. A process according to claim 12, wherein said third stream is fed to said loop at a rate to produce from 0.5% to 4.0% carburization of the sponge iron.

14. A process according to claim 13, further comprising removing carbon dioxide from said first gas stream after the latter has been cooled and before the reduction zone.

15. A process according to claim 14, wherein the gas temperature of said first gas stream, when fed to the reactor is 850° C. to 950° C.

16. A process according to claim 15, wherein the hot sponge iron removed from the reactor is briquetted at a temperature above about 700° C.

17. A process for the gaseous reduction of particulate iron ore in a vertically arranged, moving bed reactor to produce hot sponge iron with a predetermined degree of carburization, said reactor having a reduction zone through which a reducing gas is circulated, which process comprises:

supplying ore to be reduced to the upper portion of the moving bed in said reduction zone, introducing a hot reducing gas largely composed of carbon monoxide and hydrogen into the reduction zone to flow through and react with the moving bed of iron ore to give sponge iron and an off-gas, removing said off-gas from said reduction zone, introducing into said reactor at said reduction zone a hydrocarbon effective for carburizing the sponge iron, regulating the rate of introducing said hydrocarbon into said reduction zone to vary directly the degree of carburization so as to give a predetermined degree of carburization of said sponge iron, and removing modified hot sponge iron at the bottom of said reactor.

18. A process according to claim 17, wherein the hydrocarbon is introduced in the form of a hot methane-containing gas, and the sponge iron is removed at a temperature between 600° C. and 900° C. and with a carburization of between 0.5% and 4.0% by weight.

19. A process according to claim 18, wherein said methane-containing gas is natural gas which when introduced into said reducing zone is previously mixed with said reducing gas and the resulting mixture is at a temperature between about 850° to 950° C., and said reducing gas includes recycled off-gas which has had water and $CO_2$ substantially removed therefrom.

20. A process for producing sponge iron at an elevated temperature from a particulate iron ore in a vertically arranged moving bed reactor having a reduction zone forming part of a reducing gas loop that also includes an external cooling and dewatering means and an external heating means, which process comprises, supplying ore to be reduced to the upper portion of said reducing zone, circulating a first gas stream largely composed of carbon dioxide and hydrogen through said loop, feeding to said loop between said cooling and dewatering means and said heating means a second gas stream which is a make-up reducing gas from a source outside said loop largely composed of hydrogen and carbon monoxide, effectively feeding to said loop between said cooling and dewatering means and said heating means a third gas stream largely composed of hydrocarbon gas from a source outside said loop, mixing said first, second, and third streams in said loop and heating the resulting mixture in said heating means, feeding the hot mixture to said reduction zone to cause it to reduce the iron ore therein and to cause the hydrocarbon gas in said mixture to carburize the sponge iron formed in said zone, regulating the flow of said third stream to achieve a predetermined degree of carburization of said sponge iron, and removing hot carburized sponge iron from said reactor.

* * * * *